United States Patent
Bilgic et al.

(10) Patent No.: US 9,599,494 B2
(45) Date of Patent: Mar. 21, 2017

(54) METHOD FOR OPERATING A MAGNETIC-INDUCTIVE FLOWMETER WITH IMPROVED COMPENSATION OF THE INTERFERING VOLTAGE

(71) Applicant: KROHNE Messtechnik GmbH, Duisburg (DE)

(72) Inventors: Attila Bilgic, Ratingen (DE); Helmut Brockhaus, Oberhausen (DE); Josef Neven, Mours St. Eusèbe (FR); Christoph Spiegel, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 113 days.

(21) Appl. No.: 14/647,909

(22) PCT Filed: Sep. 25, 2014

(86) PCT No.: PCT/EP2014/002599
§ 371 (c)(1),
(2) Date: May 28, 2015

(87) PCT Pub. No.: WO2015/043746
PCT Pub. Date: Apr. 2, 2015

(65) Prior Publication Data
US 2015/0323358 A1    Nov. 12, 2015

(30) Foreign Application Priority Data
Sep. 25, 2013  (DE) .................... 10 2013 015 899

(51) Int. Cl.
*G01F 1/58*  (2006.01)
*G01F 1/60*  (2006.01)

(52) U.S. Cl.
CPC ............. *G01F 1/584* (2013.01); *G01F 1/58* (2013.01); *G01F 1/588* (2013.01); *G01F 1/60* (2013.01)

(58) Field of Classification Search
None
See application file for complete search history.

(56) References Cited

U.S. PATENT DOCUMENTS

| 4,010,644 A | 3/1977 | Bonfig et al. |
| 4,157,035 A * | 6/1979 | Doll ........................ G01F 1/60 73/861.17 |

(Continued)

FOREIGN PATENT DOCUMENTS

EP    1 275 940 A2    1/2003

*Primary Examiner* — Harshad R Patel
(74) *Attorney, Agent, or Firm* — David S. Safran

(57) ABSTRACT

Method for operating for measuring the flow velocity of a flowing medium using a measuring device in which a magnetic field is induced in the flowing medium and on which a interference voltage is superimposed. During compensation measuring, a first magnetic flux density is generated in the medium and a first measuring voltage determined, a second magnetic flux density is generated in the medium and a second measured voltage determined, and a third magnetic flux density is generated in the medium and a third measured voltage determined. The flow velocity is determined from the first and second magnetic flux densities and measured voltages, and the interference voltage is determined form the third magnetic flux density and measured voltage and the determined flow velocity. Then, a fourth measured voltage is determined, and the flow velocity re-determined from the third magnetic flux density, the fourth measured voltage and the determined interference voltage.

10 Claims, 2 Drawing Sheets

(56) References Cited

U.S. PATENT DOCUMENTS

| | | | | |
|---|---|---|---|---|
| 4,422,337 A | * | 12/1983 | Hafner | G01F 1/60 |
| | | | | 73/861.17 |
| 4,704,908 A | * | 11/1987 | Blatter | G01F 1/60 |
| | | | | 73/861.17 |
| 5,955,681 A | * | 9/1999 | Hafner | G01F 1/584 |
| | | | | 73/861.17 |
| 6,453,754 B1 | | 9/2002 | Florin | |
| 2012/0047987 A1 | * | 3/2012 | Asada | G01F 25/0007 |
| | | | | 73/861.12 |
| 2013/0098166 A1 | | 4/2013 | Stange et al. | |

* cited by examiner

METHOD FOR OPERATING A MAGNETIC-INDUCTIVE FLOWMETER WITH IMPROVED COMPENSATION OF THE INTERFERING VOLTAGE

BACKGROUND OF THE INVENTION

Field of the Invention

The invention relates to a method for operating a magnetic-inductive flowmeter for measuring the flow velocity of a flowing medium. The magnetic-inductive flowmeter has a magnetic field generator with an electric magnet arrangement and a permanent magnet arrangement for generating a magnetic field with varyingly large magnetic flux densities in the flowing medium. Furthermore, the magnetic-inductive flowmeter has a measuring electrode arrangement for measuring the measuring voltage induced by the magnetic field in the flowing medium and superimposed by an interfering voltage.

Description of Related Art

Magnetic-inductive flowmeters have been known extensively for decades in the prior art. As an example, reference is made to the citation "Technische Durchflussmessung" [Technical Flow Measurement] by Prof. Dr.-Ing. H. W. Bonfig, $3^{rd}$ edition, Vulkan-Verlag, Essen, 2002, pages 123 to 167, and also to the citation "Grundlagen Magnetisch-Induktive Durchflussmessung" [Fundamentals of Magnetic-Inductive Flow Measurement] by Dipl.-Ing. Friedrich Hofmann, $3^{rd}$ edition, 2003, publication of the company KROHNE Messtechnik GmbH & Co. KG.

The basic principle of magnetic-inductive flowmeters goes back to Michael Faraday, who, in the year 1832, suggested using the principle of electromagnetic induction for measuring the flow velocity of an electrically conductive medium. According to Faraday's law of induction, an electric field is generated that is perpendicular to the direction of flow of the medium and also perpendicular to the magnetic field in a flowing, electrically conductive medium interfused by a magnetic field.

Faraday's law of induction is made use of in magnetic-inductive flowmeters of the type described in the introduction, in that the magnetic field generator provides a magnetic field, which interfuses the flowing medium. The electric magnet arrangement has at least one electric magnet and the permanent magnetic arrangement has at least one permanent magnet. The magnetic field interfusing the medium is generated by the electric magnet or electric magnets with current flowing through it/them and by the permanent magnet or permanent magnets, wherein the individual magnetic fields of the electric magnet or magnets with current flowing through it/them and of the permanent magnet or magnets overlap one another. Varyingly large magnetic flux densities in the flowing medium are applied with different currents being fed from at least one of the electric magnets. The currents can, thereby, differ from one another in algebraic sign as well as in absolute value.

The magnetic field in the medium has at least one component perpendicular to the direction of flow of the medium, whereby an electric field is formed in the medium perpendicular to both the direction of the flowing medium as well as to the direction of the magnetic field. The electric field strength of the electric field is a measure for the flow of the medium through the magnetic-inductive flowmeter.

The measuring electrode arrangement has at least two measuring electrodes, which are in galvanic contact with the medium flowing through the magnetic-inductive flowmeter. The arrangement of at least two of the measuring electrodes is preferably opposite one another on a common axis parallel to the direction of the electric field with a large as possible distance from one another, whereby the measuring voltage caused by the electric field between the measuring electrodes is at a maximum. The measuring voltage is a measure for the electric field strength and the measuring device is designed for determining the flow using the measuring voltage. Measuring electrode arrangements are also known, in which the measuring electrodes capacitively tap the measuring voltage.

Magnetic-inductive flowmeters having an electric magnet arrangement and no permanent magnet arrangement for generating a magnetic field are mostly operated with alternating magnetic fields in flowing medium. An alternating magnetic field creates an alternating measuring voltage, whereby, at least in part, a compensation of the interfering voltage is possible. A requirement for a compensation of the interfering voltage is that the temporal change of the interfering voltage is slower than the temporal change of the alternating magnetic field. Additionally, the electrochemical interfering voltage contributes to the interfering voltage.

The alternating magnetic field can be a harmonic alternating magnetic field. The temporal change of the magnetic field strength is a harmonic oscillation in harmonic alternating magnetic fields. A harmonic alternating magnetic field can be generated by feeding the electric magnet arrangement from an available alternating voltage net. The operation of magnetic-inductive flowmeters with a harmonic alternating magnetic field, in turn, has disadvantages as can be seen in DE 199 07 864 A1, column 1, line 53 to column 2, line 13, corresponding parts of U.S. Pat. No. 6,453,754 B1.

Disadvantages that result during operation of a magnetic-inductive flowmeter having a harmonic alternating magnetic field can be avoided using an alternating magnetic field that is a switched constant magnetic field. A switched constant magnetic field consists of a periodically repeating sequence of at least two intervals, wherein in each of the intervals, the magnetic field is constant after a transient period and the magnetic fields are different in two consecutive intervals. Different magnetic fields are generated by applying current with different current values to at least one electric magnet. A current is, thereby, characterized by the absolute value of the current and the direction of the current. Thus, magnetic fields can be differentiated using different magnetic field strengths and/or different magnetic field directions. For the most part, a switched constant magnetic field consists of two intervals of the same length and the magnetic fields of the intervals in the steady state have magnetic field strengths with the same absolute value, but opposing magnetic field directions.

In magnetic-inductive flowmeters of the type described in the introduction and known from the prior art, the electric magnet arrangement is used only for changing the magnetic remanence of the permanent magnet arrangement, whereby the power consumption of the magnetic-inductive flowmeter is to be decreased.

The energy requirements of the electric magnet arrangement for changing the magnetic remanence of the permanent magnet arrangement, however, is much higher in comparison to the generation of the magnetic field interfusing the flowing medium using only the electric magnet arrangement. For this reason, the frequency of the change of the magnetic remanence of the permanent magnet arrangement is less than the frequency of the alternating magnetic field in magnetic-inductive flowmeters with only an electric magnet arrangement. The low frequency of change of the magnetic remanence, however, also results in worse compensation of the interfering voltage.

SUMMARY OF THE INVENTION

The object of the present invention is thus to provide a method for operating a magnetic-inductive flowmeter of the type described in the introduction with improved compensation of the interfering voltage.

The above described and derived object is initially and essentially met in that a measuring cycle consisting of a compensation measurement sequence and a work measurement event is carried out, that at least one first measurement event, at least one second measurement event and at least one third measurement event are carried out during the compensation measurement sequence, that a first magnetic flux density $B_1$ is generated in the medium and a first measuring voltage $U_{M,1}$ is determined during the first measurement event, that a second magnetic flux density $B_2$ is generated in the medium and a second measuring voltage $U_{M,2}$ is determined during the second measurement event, and that a third magnetic flux density $B_3$ is generated in the medium and a third measuring voltage $U_{M,3}$ is determined during the third measurement event, that the flow velocity $$v_K = \frac{1}{k} \frac{U_{M,1} - U_{M,2}}{B_1 - B_2}$$

is determined using the first magnetic flux density $B_1$, the second magnetic flux density $B_2$, the first measuring voltage $U_{M,1}$ and the second measuring voltage $U_{M,2}$, that the interfering voltage $U_s = U_{M,3} - k B_3 v_K$ is determined using the third magnetic flux density $B_3$, the third measuring voltage $U_{M,3}$ and the determined flow velocity v, that the work measurement event is carried out after the compensation measurement sequence and the work measurement event consists of at least one fourth measurement event, that the third magnetic flux density $B_3$ is generated in the medium and a fourth measuring voltage $U_{M,4}$ is determined during the fourth measurement event, and that the flow velocity $$v_4 = \frac{U_{M,4} - U_S}{kB_3}$$

is determined anew using the third magnetic flux density $B_3$, the fourth measuring voltage $U_{M,4}$ and the determined interfering voltage $U_S$.

In the equations, k is a constant with the dimension [k]=1 m.

DETAILED DESCRIPTION OF THE INVENTION

Figure 1:
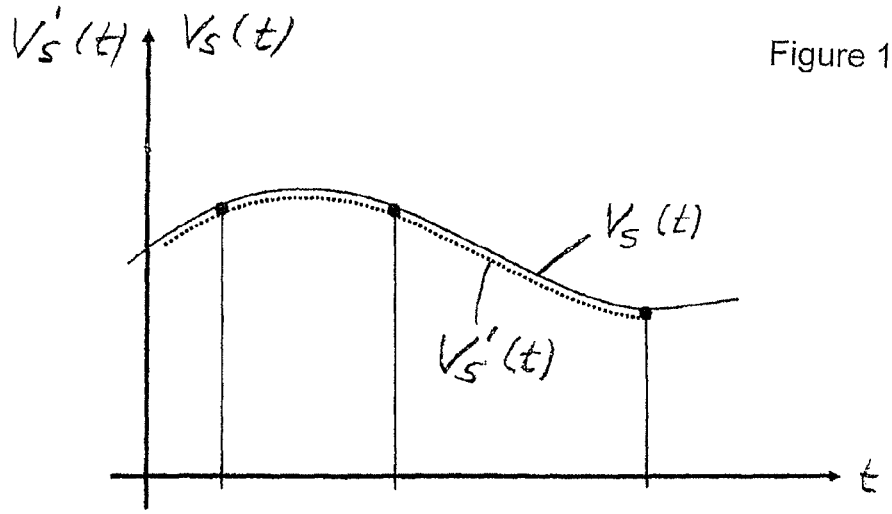
FIGS. 1-3 each show a plot of the actual interfering voltage $V_s(t)$ and the estimated interfering voltage $V'_s(t)$ as a function of time t.

In comparison to the magnetic-inductive flowmeters of the type described in the introduction as being known from the prior art, compensation of the interfering voltage is improved and, at the same time, power consumption is decreased using the method for operating a magnetic-inductive flowmeter according to the invention. Power consumption is also decreased in comparison to the magnetic-inductive flowmeters known from the prior art with only one electric magnet arrangement for generating a magnetic field.

The time interval between two compensation measurement sequences is determined by the velocity of the temporal change of the interfering voltage and the requirement of accuracy of the determination of the flow velocity. Typical time intervals of two consecutive compensation measurement sequences are less than or equal to 20 msec. Changes in the flow velocity of the medium during the compensation measurement sequence affect the determination of the flow velocity, which is why a temporally shorter compensation measurement sequence is advantageous.

The magnetic remanence (residual magnetism) of a permanent magnet can be changed by influencing the magnetization of the permanent magnet in an external magnetic field. The energy required for influencing the magnetization is taken from the external magnetic field. In order to decrease the power consumption of the magnetic-inductive flowmeter, it is thus advantageous when the magnetic remanence of the permanent magnet arrangement is not changed by the magnetic field generated by the electric magnet arrangement. In order for this to be achieved, on the one hand, a magnetically hard material can be used for the permanent magnet. On the other hand, the magnetic field generated by the electric magnet arrangement can be chosen to be so weak that only a small change occurs in the magnetic remanence of the permanent magnet arrangement. It is also possible to combine the two measures.

In order to improve the measuring accuracy, it is advantageous when at least two measurements of the measuring voltage are carried out to determine the measuring voltage. Measuring the measuring voltage at least twice results in a decrease of stochastic errors in the measuring voltage.

A further improvement in the measuring accuracy is possible when the first measurement event and the second measurement event of the compensation measurement sequence are alternately carried out. In this manner, periodic interference of the measuring voltage can be decreased.

In a particularly preferred implementation of the method according to the invention, the electric magnet arrangement is applied with a first current during the first measurement event and with a second current during the second measurement event. The absolute value of the first current is identical to the absolute value of the second current and the algebraic signs of the first current and the second current are opposites. The alternating magnetic field resulting from the application of current to the electric magnet arrangement can, for example, be a harmonic alternating magnetic field or also a switched constant magnetic field.

In a further, particularly preferred implementation of the method according to the invention, the third magnetic flux density is generated solely by the permanent magnet arrangement and the electric magnet arrangement receives no current. Thus, no energy is needed for generating the magnetic field interfusing the medium during the work measurement event. Electric energy for generating a magnetic field is thus not necessary during the compensation measurement sequence. In this manner, the electric power consumption of the magnetic-inductive flowmeter is further decreased.

In a further preferred implementation of the method according to the invention, it is provided that the change in flow velocity over time is determined in a first step using two successive flow velocities of the medium. In a second step, the change in flow velocity over time is compared to the typical change in interfering voltage over time. The typical change in interfering voltage can also be an empirically known change in interfering voltage. In a third step, if the change in flow velocity over time is greater than the typical change in interfering voltage over time, a new measuring cycle is started. These modifications in the method according to the invention make is possible to maximize the time intervals between two successive compensation measurement sequences and thus to further decrease the power consumption of the magnetic-inductive flowmeter.

Finally, the method according to the invention can also be implemented in that the course of the interfering voltage between the individual compensation measurement sequences is estimated and the estimated future course of the interfering voltage is used for calculating the flow velocity. The above estimation can be carried out using an interpolator. Furthermore, it can be advantageous to use a predicative estimation and then to use the estimated future course of the interfering voltage for calculating the flow velocity. This also allows for the predicative, estimated course of the interfering voltage to additionally be verified during the ensuing compensation measurement and, in the case that a maximum tolerable deviation is exceeded, for past measured values to be retroactively corrected.

Figure 4:
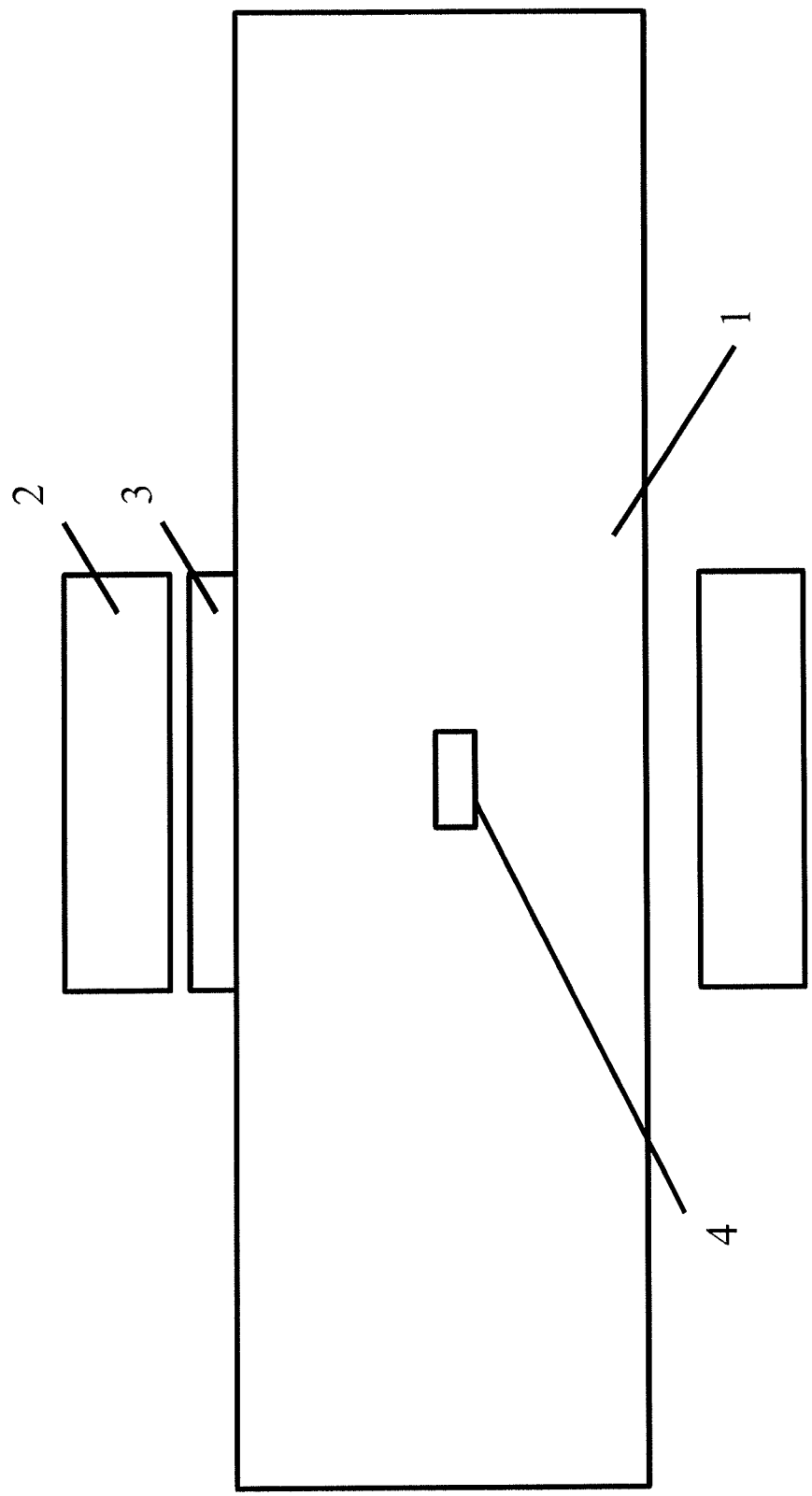
FIG. 4 is a schematic representation of a flowmeter of the type to which the inventive method is applicable.

FIG. 4 shows a magnetic-inductive flowmeter with a tube 1 for the flowing medium. The magnetic field generator comprises an electric magnet arrangement 2 and a permanent magnet arrangement 3. The measuring device comprises a measuring electrode arrangement 4 for measuring the measuring voltage induced by the magnetic field in the flowing medium and superimposed by an interfering voltage.

FIG. 1 is valid for the preferred teaching, according to which, the course of the interfering voltage between the individual compensation measurement sequences is estimated and the estimated future course of the interfering voltage is used for the calculation of the flow velocity.

Figure 2:
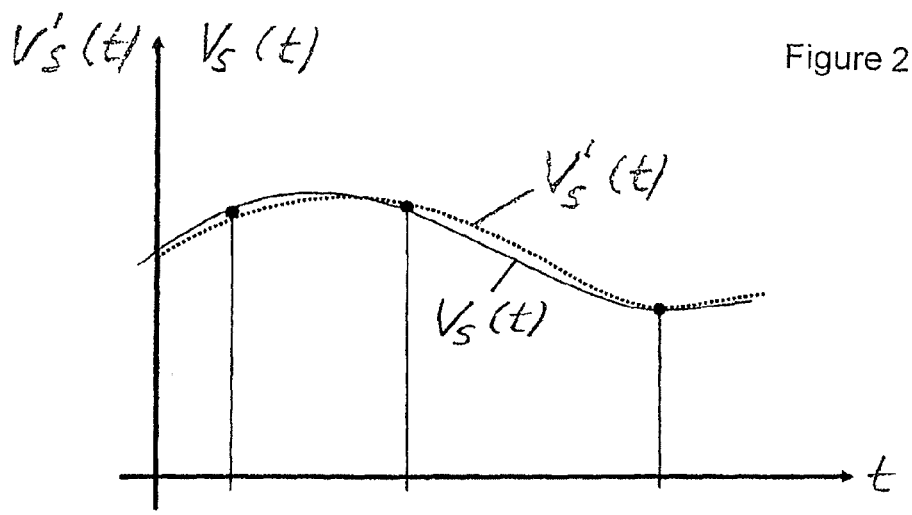

It is valid for FIG. 2 that a predicative estimation is additionally used and the estimated future course of the interfering voltage is used for the calculation of the flow velocity.

Figure 3:
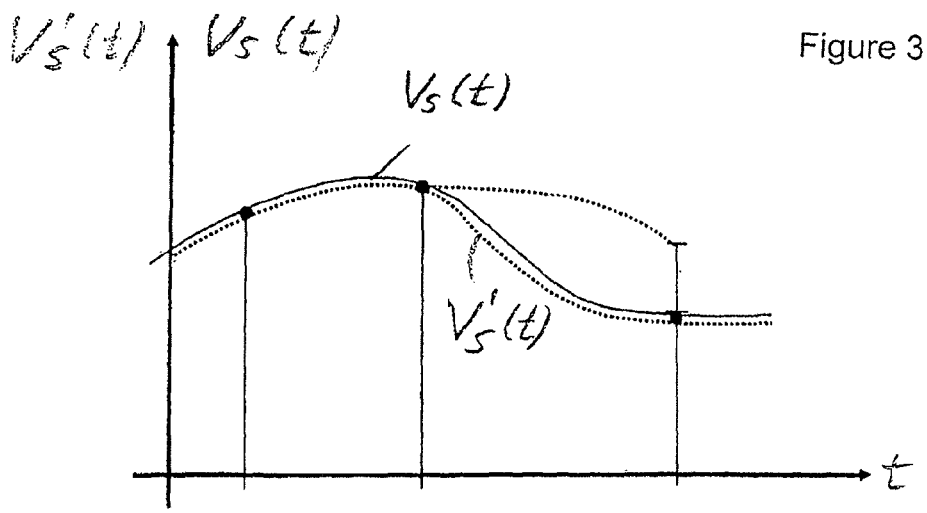

It is valid for FIG. 3 that, additionally, the predicative estimated course of the interfering voltage is verified during the consequent compensation measurement and, in the case that a maximum tolerable deviation is exceeded, past measured values are retroactively corrected.

In conjunction with the teaching that is affiliated with the first figure, it is pointed out that the estimation of the interfering voltage, e.g., by means of an interpolator, can only take place for the past, i.e. for time $t_n$, only those measured values can be calculated that have already been recorded up to that point in time $t_n$. Namely, measured values can be recorded until the next sampling of the interfering voltage, however, these cannot be compensated. This occurs retroactively, as soon as the next sample value of the interfering voltage is available.

For the preferred teaching of the invention, which is affiliated with the second figure, it is valid that an estimation of future values of the interfering voltage can be carried out using extrapolation. The only difference between the first and second figure is that the estimation is also available beyond the point in time $t_{n+2}$, although the value for the point in time $t_{n+3}$ has not yet been recorded. Thus, it is possible to immediately compensate and issue each measurement.

In conjunction with the third figure, it is pointed out that, here also, the estimation of the interfering voltage is carried out, wherein the estimation for a point in time $t > t_{n+1}$ deviates from the actual interfering voltage. Thus, an error occurs in the next measurement of the interfering voltage. If it is located outside of a threshold value defined for the respective application, the estimation of the interfering voltage is then corrected for the past. This implementation of the method according to the invention is relevant when a retrospective correction of the measured value is possible. This is the case when the compensated measured value is shown, but is not passed on to other systems. One example of a flow volume measurement device is a water meter.

What is claimed is:

1. Method for operating a magnetic-inductive flowmeter for measuring the flow velocity of a flowing medium,
   having a magnetic field generator with an electric magnet arrangement and a permanent magnet arrangement for generating a magnetic field with varyingly large magnetic flux densities in the flowing medium, and
   having a measuring device including a measuring electrode arrangement for measuring the measuring voltage induced by the magnetic field in the flowing medium and superimposed by an interfering voltage,
   wherein a measuring cycle comprising a compensation measurement sequence and a work measurement event is carried out,
   wherein at least one first measurement event, at least one second measurement event and at least one third measurement event are carried out during the compensation measurement sequence,
   wherein a first magnetic flux density is generated in the medium and a first measuring voltage is determined during the first measurement event,
   wherein a second magnetic flux density is generated in the medium and a second measuring voltage is determined during the second measurement event,
   wherein a third magnetic flux density is generated in the medium and a third measuring voltage is determined during the third measurement event,
   wherein the flow velocity is determined using the first magnetic flux density, the second magnetic flux density, the first measuring voltage and the second measuring voltage,
   wherein the interfering voltage is determined using the third magnetic flux density, the third measuring voltage and the determined flow velocity,
   wherein the work measurement event is carried out after the compensation measurement sequence and the work measurement event comprising at least one fourth measurement event,
   wherein the third magnetic flux density is generated in the medium and a fourth measuring voltage is determined during the fourth measurement event, and
   wherein the flow velocity is determined anew using the third magnetic flux density, the fourth measuring voltage and the determined interfering voltage.

2. Method according to claim 1, wherein a magnetic remanence of the permanent magnet arrangement is not changed by the magnetic field generated by the electric magnet arrangement.

3. Method according to claim 1, wherein at least two measurements of the measuring voltage are carried out for determining the measuring voltage.

4. Method according to claim 1, wherein the first measurement events and the second measurement events of the compensation measurement sequences are alternately carried out.

5. Method according to claim 1, wherein the electric magnet arrangement is applied with a first current during the first measurement event and with a second current during the second measurement event and wherein an absolute value of the first current is identical to an absolute value of the second current and algebraic signs of the first current and the second current are opposites.

6. Method according to claim 1, wherein the third magnetic flux density is generated solely by the permanent magnet arrangement.

7. Method according to claim 1, wherein a change in flow velocity over time is determined using two successive flow velocities of the medium, the change in flow velocity over time is compared to a typical change in interfering voltage over time and, if the change in flow velocity over time is greater than the typical change in interfering voltage over time, a new measuring cycle is started.

8. Method according to claim 1, wherein a future course of the interfering voltage between the individual compensation measurement sequences is estimated, and the estimated future course of the interfering voltage is used for calculating the flow velocity.

9. Method according to claim 1, wherein, additionally, a predicative estimation of a future course of the interfering voltage is used for calculating the flow velocity.

10. Method according to claim 1, wherein a predicative, estimated course of the interfering voltage is additionally verified during an ensuing compensation measurement and, in the case that a maximum tolerable deviation is exceeded, past measured values are retroactively corrected.

\* \* \* \* \*